United States Patent
Peshkin (10) Patent No.: US 6,668,668 B1
(45) Date of Patent: Dec. 30, 2003

(54) NON-CONTACTING SENSORS (75) Inventor: Michael A. Peshkin, Evanston, IL (US)

(73) Assignee: Stanley Assembly Technologies, Cleveland, OH (US)

( * ) Notice: Subject to any disclaimer, the term of this patent is extended or adjusted under 35 U.S.C. 154(b) by 0 days.

(21) Appl. No.: 09/246,826

(22) Filed: Feb. 8, 1999

(51) Int. Cl.[7] .................................................. G01L 5/00
(52) U.S. Cl. ............................... 73/862.56; 324/207.15
(58) Field of Search ....................... 73/862.56, 862.451, 73/862.453, 862.46, 862.69, 186, 188, 178, 862.625, 862.541; 254/270; 340/870.31; 364/528, 550; 212/147, 146, 159, 161; 177/12; 324/207.11, 207.12, 207.15, 207.16

(56) References Cited

U.S. PATENT DOCUMENTS

| | | |
|---|---|---|
| 3,286,989 A | 11/1966 | Bangerter et al. |
| 3,325,148 A | 6/1967 | Powell |
| 3,384,350 A | 5/1968 | Powell |
| 3,421,737 A | 1/1969 | Ubling |
| 3,517,830 A * | 6/1970 | Virkkala ..................... 212/275 |
| 3,595,331 A * | 7/1971 | Gast et al. ............... 177/210 R |
| 3,654,415 A | 4/1972 | Hawkins et al. |
| 3,755,725 A | 8/1973 | Cordes |
| 3,772,579 A | 11/1973 | Stone et al. |
| 3,863,772 A | 2/1975 | Schwartz |
| 3,916,279 A | 10/1975 | Kawano et al. |
| 3,982,733 A | 9/1976 | Orme |
| 4,334,217 A | 6/1982 | Nield et al. |
| 4,636,962 A | 1/1987 | Broyden et al. |
| 4,646,087 A | 2/1987 | Schumann |
| 4,665,361 A * | 5/1987 | Dorsch et al. ......... 324/207.15 |
| 4,807,767 A | 2/1989 | Kornely |
| 4,906,924 A | 3/1990 | Zannis ................... 324/207.18 |
| 4,917,360 A | 4/1990 | Kojima |
| 4,975,643 A * | 12/1990 | Buchwald |
| 4,997,095 A * | 3/1991 | Jones et al. .................. 212/275 |
| 5,109,223 A * | 4/1992 | Schmitt et al. ......... 340/870.31 |
| 5,186,049 A * | 2/1993 | Shannon ..................... 73/186 |
| 5,189,375 A * | 2/1993 | Tuttle ......................... 324/537 |
| 5,195,377 A * | 3/1993 | Garshelis |

(List continued on next page.)

FOREIGN PATENT DOCUMENTS

| | | |
|---|---|---|
| DE | 1756441 | 4/1970 |
| DE | 2211359 | 9/1973 |
| DE | 3205705 | 8/1983 |
| EP | 0 262 134 B1 | 4/1988 |
| EP | 0305591 | 3/1989 |
| EP | 0 471 026 B1 | 2/1992 |
| EP | 0 733 579 A1 | 9/1996 |
| GB | 641674 | 8/1950 |
| GB | 1557867 | 12/1979 |

Primary Examiner—Edward Lefkowitz
Assistant Examiner—Jewel V. Thompson
(74) Attorney, Agent, or Firm—McDonnell Boehnen Hulbert & Berghoff (57) ABSTRACT

A system and method for measuring the deflection angle of a cable from an initial position is disclosed. The cable is energized with an alternating electric current that creates a magnetic field associated with the cable. Pickup coils are positioned adjacent to the cable and oriented to measure the deflection of the cable in different directions. In an initial position, the magnetic field of the cable is parallel with and does not interact with pickup coils. In the deflected position, the magnetic field of the cable intersects and interacts with the pickup coils. The interaction of the magnetic field with the pickup coils induces a voltage in the pickup coils that indicates the angle of deflection of the cable. Also disclosed are methods and devices for providing a more durable and rugged sensor capable of detecting forces along a single axis. Still other embodiments disclose methods and devices for determining the orientation of a surface or object with respect to another surface.

23 Claims, 7 Drawing Sheets

U.S. PATENT DOCUMENTS

| | | | |
|---|---|---|---|
| 5,315,073 A | * 5/1994 | Ast et al. | 177/212 |
| 5,350,075 A | 9/1994 | Kahlman | |
| 5,481,189 A | * 1/1996 | DiLella et al. | |
| 5,502,379 A | 3/1996 | Hansel et al. | 324/207.14 |
| 5,522,581 A | 6/1996 | Kulhavy | |
| 5,764,066 A | 6/1998 | Novak et al. | |
| 5,808,904 A | * 9/1998 | Rasmussen et al. | 364/528 |
| 5,825,105 A | * 10/1998 | Barber et al. | 310/12 |
| 5,831,270 A | * 11/1998 | Nakasuji | 250/396 ML |
| 5,848,781 A | 12/1998 | Kulhavy et al. | |
| 5,850,928 A | 12/1998 | Kahlman et al. | |
| 5,865,426 A | * 2/1999 | Kazerooni | 254/270 |
| 5,915,673 A | * 6/1999 | Kazerooni | 254/270 |
| 6,126,115 A | * 10/2000 | Carrier et al. | |
| 6,311,557 B1 | * 11/2001 | Davis et al. | |
| 6,400,549 B1 | * 6/2002 | Davis et al. | 361/144 |

* cited by examiner

NON-CONTACTING SENSORS

FIELD OF INVENTION

This invention relates in general to a method and device for determining the forces applied to a support member or cable. In particular, the deflection of the support may be measured to determine the force input to a support member or a payload suspended by the support member. Other embodiments of the invention relate to a method and device for measuring forces applied along a single axis as well as a method and device for determining the orientation of a surface or object.

BACKGROUND OF THE INVENTION

Motorized gantry cranes as well as non-motorized overhead rail systems may be used to assist a human operator in moving bulky or heavy payloads. In either case, a powered hoist is most commonly used to lift the payload. For large loads supported by a gantry crane, a motor-driven trolley and bridge rail transport the hoist in accordance with the operator's commands issued through a control box. For smaller loads supported by an overhead rail system the operator may push on the payload directly, causing the free-rolling trolley and bridge rail to follow along passively.

An intuitive interface to the gantry crane would allow better dexterity than is afforded by a control box. An intuitive interface to the overhead rail system would allow the addition of motors without reducing the operator's dexterity. Thus, an appropriate interface would allow gantry cranes the benefit of the operator's dexterity and overhead rail systems the benefit of powered motion.

In either case the powered motion of the trolley and bridge rail must reflect the operator's intent, which is most naturally expressed by pushing directly on the payload. If the payload is suspended by a support means or cable, the degree and direction of its deflection may be used to indicate the force applied to the payload by the operator.

A number of different techniques have been practiced to measure the position or movement of a support means or cable suspending a payload. Typically, mechanical means of detecting the position of the support have been used, such as a moveable wiper arm running against a potentiometer. The resistance varies as the moveable wiper arm moves along the length of the potentiometer.

U.S. Pat. No. 3,982,733 to Orme entitled "Gimbaled Sheave With Cable Angle Sensors" describes a system for maintaining the position of a helicopter or waterborne platform over a underwater array suspended from a cable by measuring the angle of the cable. The angle of the cable is measured using a conventional mechanical means, a rotary transformer encoder. The patent describes a design of a gimbaled sheave from which the cable pays out that allows the angle of the sheave to be measured by the rotary transformer encoder to determine the angle of the cable.

U.S. Pat. No. 5,350,075 to Kahlmann entitled "Arrangement For Controlling The Direction And Movement Of A Load Hoist Trolley" also describes a mechanical means of measuring the movement of a cable. The movement of the cable is used to determine the force manually applied to a payload suspended from a cable. The force applied by an operator to the payload produces a displacement of the payload and the suspending cable.

Slightly below the hoist, the cable passes through a guide that moves laterally as the cable moves with the movement of the payload. The lateral motion of the guide is measured and gives an indication of the force applied by the operator.

A mechanical device coming in contact with the movable support, however, can constrain and impede the motion of the support and may be easily damaged by a sudden violent or uncontrolled movement of the support. In an industrial application, even a relatively small and controlled movement of a heavy payload can be translated and magnified to a sudden and violent movement of its supporting means. To provide a device capable of withstanding the rigors of such potential shocks and impacts without sustaining damage, an attempt can be made to construct the device of sufficient structure rugged enough to withstand such shocks. Such a durable device of increased ruggedness, however, may be heavy, expensive to build, and still constrain the movement of the support. Thus, to efficiently and reliably detect the motion of the support, a mechanism that does not contact the support is desired.

To this end, a number of optical and electrical means of detecting the position of a support without physically contacting the support have been suggested.

U.S. Pat. No. 5,785,191 to Feddema entitled "Operator Control Systems And Methods For Swing-Free Gantry-Style Cranes" describes techniques for eliminating the unwanted swing of a payload suspended from a crane. Gantry-style cranes are usually moved by operating left/right & forward/back push buttons to start and stop the crane. The sudden stops and starts of the crane cause the suspended payload to swing. The patent suggests a non-contact cable angle sensor using a capacitance measurement but does not disclose the suggested cable angle sensor.

U.S. Pat. No. 4,464,087 to Schumann entitled "Inductively Coupled Position Detection System" shows a non-contacting technique for determining the position of a hand-held joystick moveable member relative to two or three orthogonal axes. The disclosed system shows an inductively coupled position sensing device having a drive coil affixed to the moveable member of interest and pickup coils which are located to define a pair of intersecting stationary axes, i.e. an X-Y coordinate system with four quadrants. One of the pickup coils is located in each of the quadrants. The pickup coils are arranged and interconnected such that the mathematical sum of the induced voltages will be of a magnitude and polarity indicative of the position of the moveable member. The disclosed device is configured for a joystick application that may be suitable for a force-sensing handle. It is still, however, not suitable for an overhead rail system where the payload is free to rotate and swivel without providing directional information.

Thus, it would be desirable to provide a system capable of improving the detection and measurement of force applied to a suspended payload.

In addition to moving a payload in the lateral direction, there is also a need to control the load in the up-down direction or Z-axis direction. A hoist for lifting heavy objects is typically controlled by a control box having up/down push buttons. To cause the hoist to raise the payload, a button corresponding to raising the payload up is pushed and released.

To lower the payload, a second button corresponding to lowering the payload is pushed and released. Raising and lowering the load through the actuation and release of the control push buttons require the operator to carefully watch the load and time his actuation and release of the push buttons. Thus, it is desirable to provide a more intuitive and direct method of operating the hoist to raise and lower the load.

When the operator's force in a lateral direction causes the bridge rail of a gantry crane to traverse along its long rails, it is necessary to control the motion of the bridge rail such that it remains perpendicular to the long rails. This may be done by sensing any deviation from perpendicularity and correcting the deviation. The sensing of the skew angle of the bridge rail is subject to similar requirements of ruggedness as those involved in the sensing of lateral movement of the cable, and the sensing of axial forces along the cable. A non-contact sensor is desirable for this purpose.

SUMMARY OF THE INVENTION

In accordance with an illustrative embodiment of the invention, problems associated with measuring the deflection of a support member or suspended cable are addressed. The illustrative embodiment of the invention can be used, for example, to measure the magnitude and direction of forces applied to a payload attached to the support member. From the measured deflection of the support member, the forces applied to a payload can be determined. The illustrative embodiment can be used with a gantry crane or overhead rail system to determine an operator's intent in guiding an object or payload.

In an embodiment of the invention, the deflection angle that the support member deviates away from an initial or neutral position is measured. The initial or neutral position is the position where the forces applied to the support member are at equilibrium or at an initial predetermined level, such as the support resting in a vertical position. In response to an applied force, such as a human operator pushing the payload attached to the support member, the support member will be displaced or deflected from its initial position an amount or magnitude and direction proportional to the applied force. The deflection of the support member from its initial position forms an angle from its initial position. The measured deflection angle indicates the magnitude and direction of the force applied to the payload.

According to an aspect of the invention, mechanical or physical contact with the support is not required. Pickup coils positioned adjacent to the support member detect the angle of the support. In this embodiment, the pickup coils are planar coils oriented relative to the opening through which the support passes such that the plane of the opening and the plane of the pickup coils lie in the same horizontal plane. In a particular embodiment, printed coils in a electronic printed circuit board are used. In other embodiments of the invention, wire wound coils may also be used.

According to another aspect of the invention, the support member has a magnetic field associated with it that interacts with the pickup coils positioned adjacent to the opening. In a preferred embodiment, energizing the support member with an electric alternating current ("AC") signal creates the magnetic field. The AC signal carried by the support member creates a fluctuating magnetic field around the support that is parallel to the plane of the pickup coils. When the support member is at an initial position, the magnetic field is parallel to and does not interact with the pickup coils. When the support member is deflected by an applied force, however, it undergoes an angular deviation that causes the magnetic field to undergo a corresponding angular deviation which causes the magnetic field to intersect into the plane of the pickup coils. The interaction of the fluctuating magnetic field with the plane of the pickup coils induces a corresponding voltage in the pickup coils that indicates the angle of deviation of the support member from its initial vertical position.

According to another aspect of the invention, a detector circuit detects the voltage induced in the pickup coils and indicates the angle of deflection of the support member. In a particular embodiment, the detector circuit uses synchronous detection to demodulate the voltage induced in the pickup coils and outputs a direct current ("DC") signal proportional to the angle of the support member.

According to another embodiment of the invention, the problems associated with stray magnetic field affecting measurements are addressed. In a preferred embodiment, a non-ferromagnetic but conductive shield is used to prevent the coils from picking up extraneous signals or noise that may cause spurious readings and affect the cable angle measurements. The shield protects against stray magnetic fields and allows the pickup coils to measure only the magnetic field from the support member.

In yet another embodiment of the invention, the support or cable is energized to carry an AC signal without physical contact with the cable. In a particular embodiment, a toroidal transformer induces an alternating electric current in the support member.

In accordance with another illustrative embodiment of the invention, problems associated with measuring the vertical forces exerted on a support member or cable are addressed. In this embodiment, an operator can exert forces up or down on the cable to direct the hoist to raise and lower the payload. A handle is preferably positioned on the cable coaxial to the cable and surrounding the cable. A one-axis force sensor connected to the handle using a piezoelectric sensor or strain gauge can directly measure the magnitude and direction of applied forces. The measured force applied to the handle in the up and down (vertical) direction can be measured and then used by the hoist to determine whether to raise or lower the payload.

In an embodiment of the invention, a spring is connected to the handle to convert a force applied to the handle into a displacement of the handle. The displacement of the handle can be measured to determine the force applied to the handle. Springs are commonly used to convert force to displacement. Prior art techniques have involved reading this displacement with a potentiometer or optical encoder.

According to a preferred embodiment of the invention, the spring is energized to carry an AC electrical signal. As a force is applied to the handle, the spring compresses, causing the coils of the spring to move closer together. Due to the movement of the spring coils, the inductance of the spring varies according to the force applied to the handle.

Detector circuitry detects the change in inductance of the spring and determines the force and the intent of the operator in raising or lowering the hoist. According to this embodiment, a more durable device to measure forces applied to an handle in the vertical z-axis can be provided.

In accordance with another illustrative embodiment of the invention, problems associated with determining the orientation of an object are addressed. In an embodiment according to this aspect of the invention, a parallelism sensor provides the ability to measure the degree of parallel orientation of an object with respect to another plane or surface.

The preferred embodiment of the parallelism sensor includes a sensor pad having an energized coil flanked by a pair of pickup coils. The energized coil produces a fluctuating magnetic field that is sensed by the pickup coils. When the sensor pad is parallel to a conductive surface, the magnetic flux lines passing through the pickup coils are equal. When the sensor pad is not parallel to the conductive surface, the magnetic flux lines passing through the pickup coils are no longer equal and a voltage is induced in the pickup coil circuitry.

In the illustrative embodiment described herein, the parallel orientation information is supplied as feedback to a motion control system such as one that controls the movement of an overhead rail system.

The preferred embodiments have many uses and advantages. The deflection of a payload or support member can be measured without physical contact with the measured support or payload. This is an advantage because such physical contact may cause damage to the device or impede the motion of the support member. The measured deflection of the support can be utilized to determine the forces applied to a payload attached to the support. In a particular embodiment of the invention, the magnitude and direction of the force indicates the operator's intent in moving the payload and determines the proper additional force to assist an operator in manipulating the device as desired. According to other embodiments of the invention, the vertical forces applied to a cable can be measured and used to determine whether to raise or lower the payload. The disclosed embodiments provide a durable device that is capable of withstanding the constant handling, shock, and abuse that such a load handle is likely to suffer. According to still other embodiments of the invention, the orientation of an object or surface with respect to a surface can be determined without contact between the two surfaces. This embodiment allows the relative orientation of the two objects to be determined without mechanical assemblies. This is an advantage because such assemblies may constrain the movement of the objects and eventually wear, causing the assemblies to no longer function properly.

The foregoing and other features and advantages of the illustrative embodiments of the present invention will be more readily apparent from the following detailed description, which proceeds with references to the accompanying drawings.

BRIEF DESCRIPTION OF THE DRAWINGS

FIG. 1A shows a top view of the overhead rail system, while FIG. 1B shows a front and side perspective view of the system.

FIG. 8A shows a diagram of the arrangement of coils of an embodiment of the parallelism sensor, while

DETAILED DESCRIPTION OF AN ILLUSTRATIVE EMBODIMENT

Figure 1A:
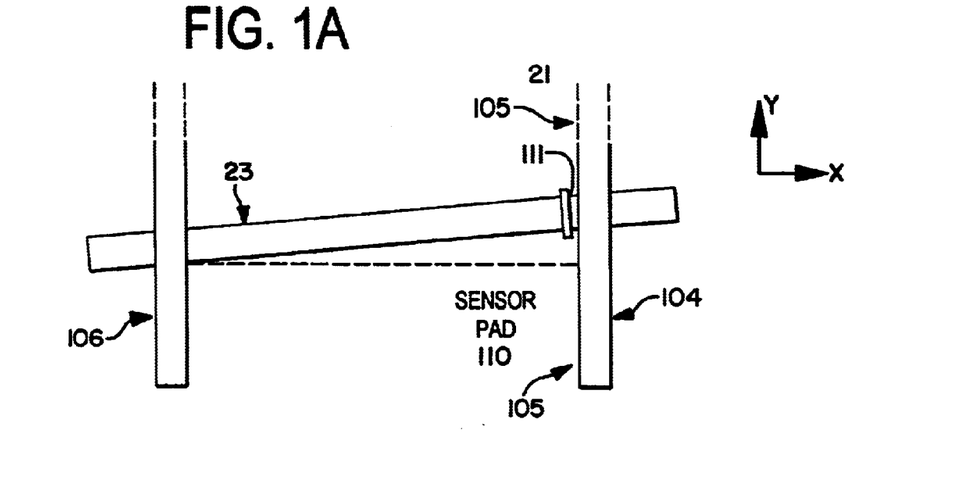
FIGS. 1A and 1B show a simplified perspective view of an illustrative embodiment utilizing an overhead rail system suspending a payload. Specifically, the illustrative embodiment shows a cable angle sensor, a z-axis detector, and a particular application of a parallelism sensor in an overhead gantry crane system.
Figure 1B:
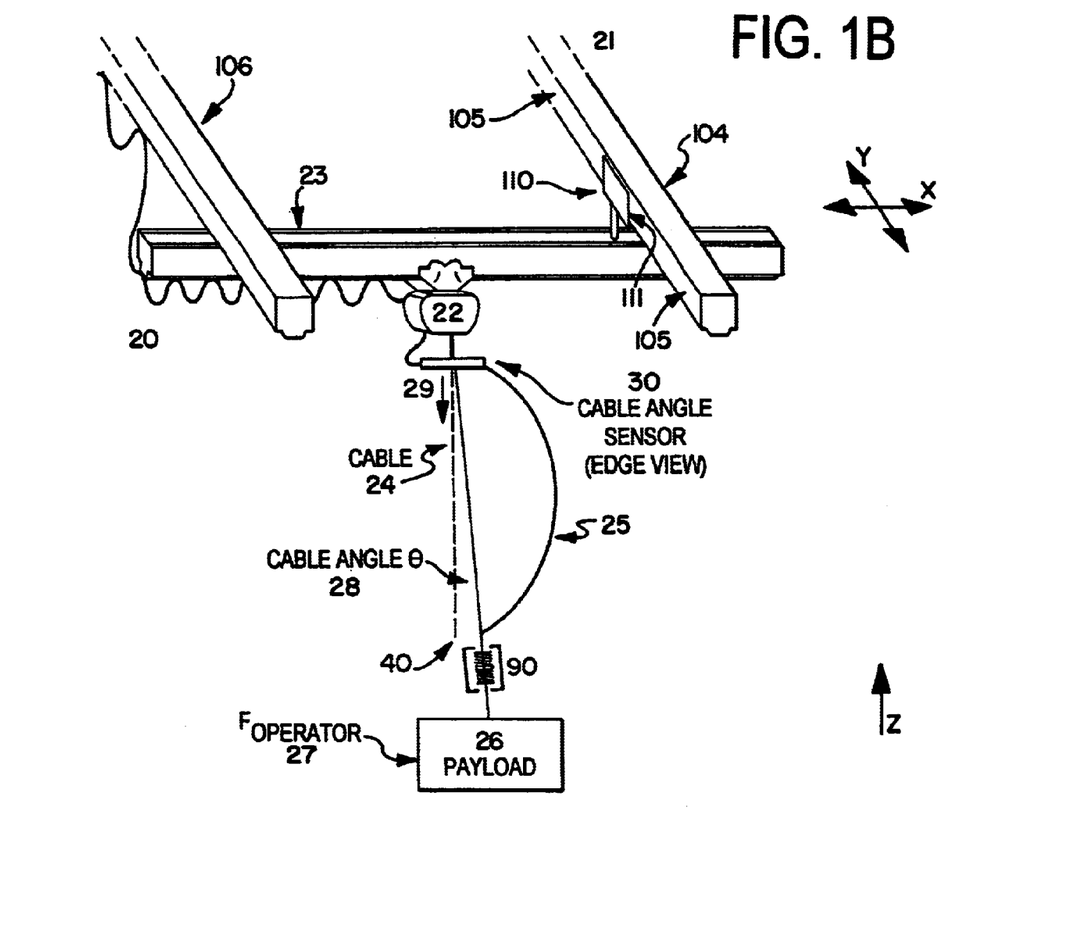

FIG. 1B diagrammatically illustrates a simplified example of a movable rail system utilizing an illustrative embodiment of the invention. The moveable rail system 20 is designed to support a payload 26 and permit the payload 26 to move in the X, Y, or X and Y coordinate directions under the support of the system 20. Accordingly, an appropriate frame structure 21 typically provides a movable rail 23 with a movable cable balancer or hoist 22 to support the payload 26 and allow it to move in either the X or Y coordinate directions, or both. The frame structure 21 can be attached to an overhead ceiling structure or include an appropriate elevating support structure to position the frame structure 21 in an overhead position. Such moveable rail systems are commonly used as overhead rail systems in a number of manufacturing and industrial applications.

In an illustrative system, the moveable rail system 20 supports or suspends a payload 26 from a cable 24 pivotally mounted to a cable balancer or hoist 22, which is movable along the X-Y axes of the rail system 20. The cable 24 is retracted into or paid out by the hoist 22 to control the elevation of the payload in the Z-axis direction. As the operator pushes the payload 26 around, the hoist 22 also moves about the overhead rail system 20 mounted on a motorized carriage or trolley (not shown) to follow the movement of the payload 26. The movement of the hoist 22 trolley is controlled by motors that allow movement of the hoist 22 trolley along the X-Y axes of the overhead rail system 20. In this embodiment, a first motor controls the movement of the hoist 22 trolley in the X-axis direction along the rail 23 and a second motor controls the movement of the bridge rail 23. The bridge rail 23, accompanied by the hoist 22 and payload 26, can also be mounted on trolleys for motion in the Y-axis direction.

It should be understood that the movable rail system 20 is an illustrative application of an embodiment of the invention and the rails system and details of the construction of the movable rail system 20 are not critical to the embodiment of the preferred device. In other applications, the system may support the payload from an overhead crane or even support the payload from below using a rigid support member mounted on a platform or dolly to allow movement of the payload. In addition, the present invention can be used in instrumentation devices or other applications that require measuring the deflection of a support member.

Referring again to FIG. 1B, an operator pushes directly on the payload 26 to move the payload 26 in the desired direction. As a result of the applied force 27 the payload 26 is displaced a distance. Although the suspended payload 26 may be free to immediately move as a result of the applied force 27, the hoist 22 trolley remains initially stationary, causing the payload 26 to swing slightly from the cable 24. The movement of the payload 26 also causes the supporting cable 24 to deflect from its initial vertical position 40. The deflected position of the cable 24 creates an angle 28 between the deflected position of the cable 24 and the initial cable position 40. This cable angle 28 is of a magnitude and direction indicative of the force applied by the operator.

To measure this cable angle 28, a cable angle sensor 30 is preferably mounted to the hoist 22 or to the carriage or trolley from which the hoist is mounted such that the supporting cable 24 passes through the cable angle detector 30 near the exit portal where the cable 24 emerges from the hoist 22. The cable angle sensor 30 detects and measures the deflection angle 28 of the cable 24 near the balancer or hoist 22. The measured cable angle 28 deflection can be communicated to the hoist trolley and rail trolley motors to move and maintain the balancer 22 over the moving payload 26. A signal wire 25 connects the suspended cable 25 to the cable angle sensor 30.

In the preferred embodiment of the invention, the cable 24 has a magnetic field associated with the cable 24. The magnetic field associated with the cable 24 is preferably created by an alternating current ("AC") signal 29 carried by the cable 24. To carry the AC signal 29, the cable 24 or at least a portion of the cable is electrically conductive and capable of carrying an AC signal 29. For example, the cable 24 may include a steel cable having a solid, coaxial or stranded wire construction to carry an AC signal 29 and also have a sufficient tensile strength to adequately support a dynamically moving payload with a high margin of safety. In the preferred embodiment the AC signal 29 is of a low magnitude and voltage such that there is no risk of harm to personnel coming in contact with the cable 24, and indeed the top end of the cable is electrically grounded. Preferably, the payload 26 is isolated from the cable 24 to avoid diminishing the AC signal 29 in the cable 24 if the lower end of the cable or the payload 26 were also to come into contact with an electrical ground.

In alternate embodiments, the cable 24 may be composed of a structural component such as a multi-link chain, stranded or composite material, or other weight bearing or strengthening components that may not be electrically conductive or of a uniform cross section to carry an AC signal 29 to provide a uniform magnetic field. For example, non-uniform materials may cause horizontal electrical currents resulting in non-uniform and usable magnetic fields. The strengthening structural component can be supplemented with a conductive portion or covered with a conductive sheath or pipe to provide an appropriate magnetic field. Although a welded-link chain energized with an AC signal has a sufficiently uniform magnetic field, a pipe surrounding the chain will "smooth out" the magnetic field, just as if the pipe itself were carrying the current.

The cable 24 is thus capable of supporting the payload 26 and carrying an AC signal 29 that creates a fluctuating magnetic field associated with the cable 24. The magnetic field lies in a plane perpendicular to the direction of the AC signal 29 running through the cable 24 and is circumferential around the cable 24, with the magnetic flux lines describing concentric circles centered about the cable 24 in a plane extending outward perpendicular to the cable.

Figure 2:
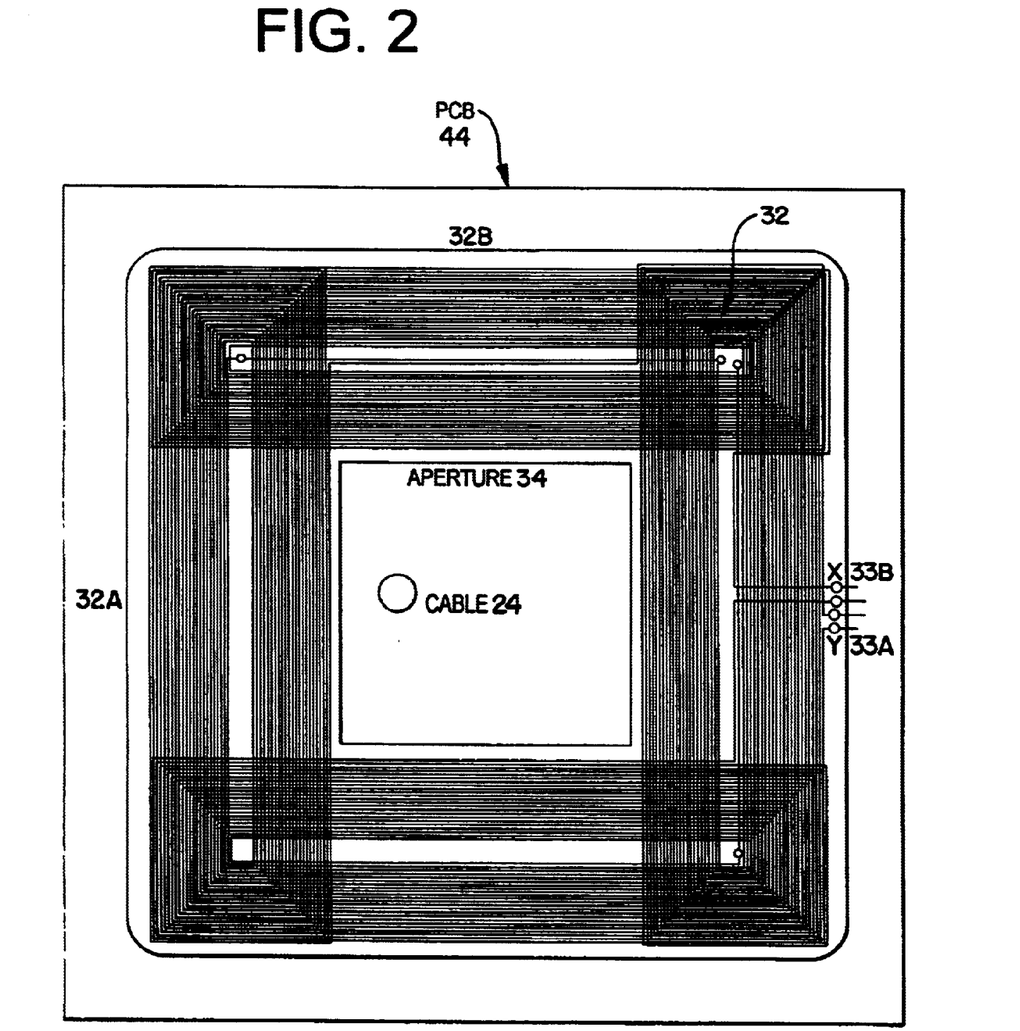
FIG. 2 shows the top view of an arrangement of pickup coils fabricated on a printed circuit board layout of an illustrative cable angle sensor used in the embodiment shown in FIG. 1B.

FIG. 2 shows a top view of an illustrative embodiment of an electronic printed circuit board (PCB) 44 layout of the pickup coils 32 of the cable angle sensor 30.

Specifically, FIG. 2 shows a preferred layout of the pickup coils 32. The printed circuit board 44 construction shows a plurality of pickup coils 32 positioned adjacent to an aperture 34. The aperture 34 is essentially a space forming an opening through the printed circuit board. The aperture 34 allows the cable 24 to pass in the proximity of the pickup coils 32. Accordingly, the aperture 34 is of a sufficient size to allow the cable 24 to pass through the aperture 34 and permit the cable 24 to sufficiently deflect through a possible range without physical interference with the printed circuit board 44. The size of the aperture 34 is therefore selected as a function of the expected movement of the payload 26.

It should be understood that although described and shown as an aperture 34, in other embodiments the aperture 34 may not constitute an opening or hole and may take other forms which allow the cable 24 to pass within the proximity of the pickup coils 32. For example, the aperture 34 need not be disposed within the printed circuit board 44, but the pickup coils 32 may be positioned on an appropriate supporting structure in the proximity of the cable 24. The pickup coils 32 are provided with the proper orientation to detect the deflections of the cable 24 in the desired coordinate directions.

In this embodiment, the pickup coils 32 are arranged adjacent to and surrounding the aperture 34. Preferably, the pickup coils 32 are printed right into the printed circuit board 44 which is of a multi-layer board construction where each of the pickup coils 32 is confined to a separate layer of the board. Printing the pickup coils 32 into the circuit board 44 simplifies the construction of the device, however, utilizing this construction limits the number of wire turns forming the pickup coils 32 to about 20 turns or so in this embodiment. An alternate embodiment utilizing pickup coils wound of wire windings can provide a potentially more sensitive pickup by allowing more wire turns to be used. In addition, a transformer or amplifier can also effectively multiply the number of physical wire turns. For example, using a 1:25 audio transformer at the first stage of a detector for a pickup coil with 20 turns creates a pickup coil with 500 effective turns. The pickup coils 32 are connected through outputs 33A, 33B to the detector or demodulator circuitry 70 described in FIG. 4 (not shown in FIG. 2) below. Alternatively, the detector or demodulator circuitry 70 shown in FIG. 4 can be fabricated (not shown) on the printed circuit board 44 in addition to the pickup coils 32.

Preferably, the pickup coils 32 are positioned to surround the aperture 34 such that the arrangement of the pickup coils 32 are symmetric about the aperture 34. In this embodiment, two pickup coils 32A, 32B surrounding the aperture 34 are shown. Each of the pickup coils 32A, 32B form wire spiral windings arranged on opposite sides of the aperture 34. In this embodiment, the spirals of the pickup coils are planar or flat such that they lie in approximately the same horizontal plane of the printed circuit board. The different pickup coils 32A, 32B also lie in approximately the same horizontal plane. A first pickup coil 32A is oriented along one coordinate direction to measure the deflection of the cable in the X-axis direction and the second pickup coil 32B is arranged perpendicular to the first pickup coil 32A to measure deflections in the other coordinate direction, the Y-axis direction. In the preferred printed circuit board 44 layout, each pickup coil is restricted to one side of a double-sided printed circuit board to allow for the arrangement of the two pickup coils 32A, 32B to physically overlap one another.

It should be understood that many other arrangements of pickup coils 32 can also be utilized to measure the deflection of a support member as desired. The pickup coils 32 may also include other varieties such as wire windings about a core or spool. Wire-wound pickup coils may be mounted atop a printed circuit board or separately mounted or housed within the proximity of the aperture 34. Of course, different numbers of spirals or wire turns can be used in a variety of different configurations.

In the illustrative embodiment of FIG. 2, each of the pickup coils 32A, 32B provides a respective output 33A, 33B corresponding to the deflection of the cable 24 along one of the X-Y axes according to the orientation of the pickup coil. The pickup coils 32A, 32B also are provided with the proper polarity such that the winding of a pickup coil is counterclockwise on one side of the aperture and then clockwise on the other side, as shown in FIG. 2.

Generally, the initial position of the cable 24 and orientation of the pickup coils 32 is such that the magnetic field associated with the cable 24 is co-planar with the pickup coils 32. In the initial position, the cable 24 is vertical and the direction of the fluctuating magnetic field associated with the cable is in the horizontal plane parallel with the plane of the spiral of the pickup coils. The magnetic field and the pickup coils 32 are thus co-planar and the magnetic field does not intersect with the plane of the pickup coils 32. Accordingly, there is no interaction between the fluctuating magnetic field and the pickup coils 32 and no voltage or signal is induced in the pickup coils 32 by the magnetic field.

Referring again to FIG. 1B, when an operator applies a force 27 to the payload 26, the payload 26 will be displaced, creating a corresponding motion of the cable 24 away from its initial vertical position 40, similar to the motion of a swinging pendulum. As a result, the cable 24 attached pivotally at the end of the cable 24 opposite the payload 26 will undergo a change in angle 28 with respect to the cable's initial vertical position 40. The cable deflection angle 28 changes the angle of the AC signal 29 carried by the cable 24, creating a corresponding change in the direction of the fluctuating magnetic field associated with the cable 24. The change in direction of the fluctuating magnetic field is such that the magnetic field will no longer lie in a horizontal plane parallel to the pickup coils 32, which remain in a horizontal plane. Rather, the angle of the magnetic field will cause the magnetic flux lines to intersect the plane of the pickup coils 32.

The intersection of the magnetic field with the plane of the coils 32 causes an interaction between the fluctuating magnetic field and the pickup coils 32 that induces a voltage and corresponding current in the pickup coils 32. The greater the deflection angle 28 of the cable 24, the greater the intersection of the fluctuating magnetic field with the pickup coils 32, resulting in a greater induced voltage in the pickup coils 32. The relative ratio of voltages induced in the pickup coils 32A and 32B oriented along the X and Y coordinate axes indicates the direction of the deflection of the cable 24.

Thus, the magnitude of the force 27 applied to the payload 26 creates a displacement of the payload 26 and a proportional deflection and angulation of the cable 24 that results in an angulation of the magnetic field. The angulation of the magnetic field causes a proportional interaction with the pickup coils 32 that induces a voltage and signal within the pickup coils 32 that is proportional to the intersection between the magnetic field and the plane of the pickup coils 32. Based on the magnitude of the voltage and current generated from the pickup coils 32 and the ratio of the voltages induced in the pickup coils 32A 32B, the angulation of the cable 24 can be determined. From the angulation of the cable 24, the magnitude and direction of the force applied 27 by the operator to the payload 26 can be determined.

Figure 3:
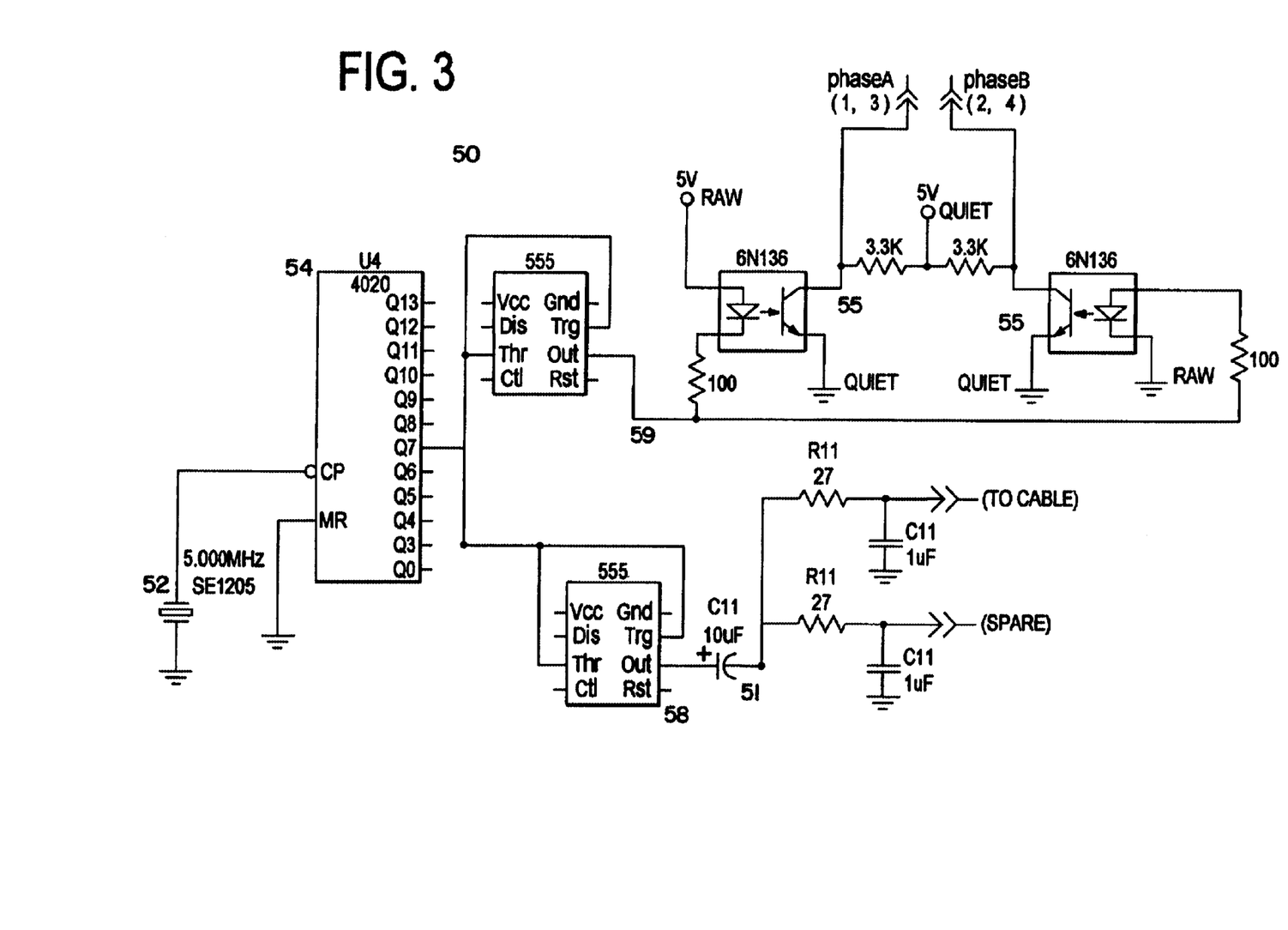
FIG. 3 shows an exemplary wave generator circuit used in the embodiment of FIG. 1B.

FIG. 3 shows a circuit diagram of a signal or wave generator 50 providing an AC signal 58 to energize the cable 24 and create the magnetic field associated with the cable 24. In this embodiment, the desired AC signal 58 is generated from a frequency oscillator such as an 5.0 MHz crystal oscillator 52. The 5.0 MHz frequency oscillator signal output is divided by the 4020 frequency divider 54 to achieve the desired frequency AC signal 58. Preferably, the 4020 frequency divider 54 divides the 5.0 MHz signal to obtain an AC signal of a lower frequency, preferably in the 40 KHz range. In this example, the wave generator 50 outputs a 40 KHz frequency square wave which is buffered by a 555 timer to produce a current signal of about a 50 mA. The AC signal 58 produced by the wave generator 50 is used to excite or drive the AC signal 29 in the cable 24 to produce the magnetic field.

Figure 4:
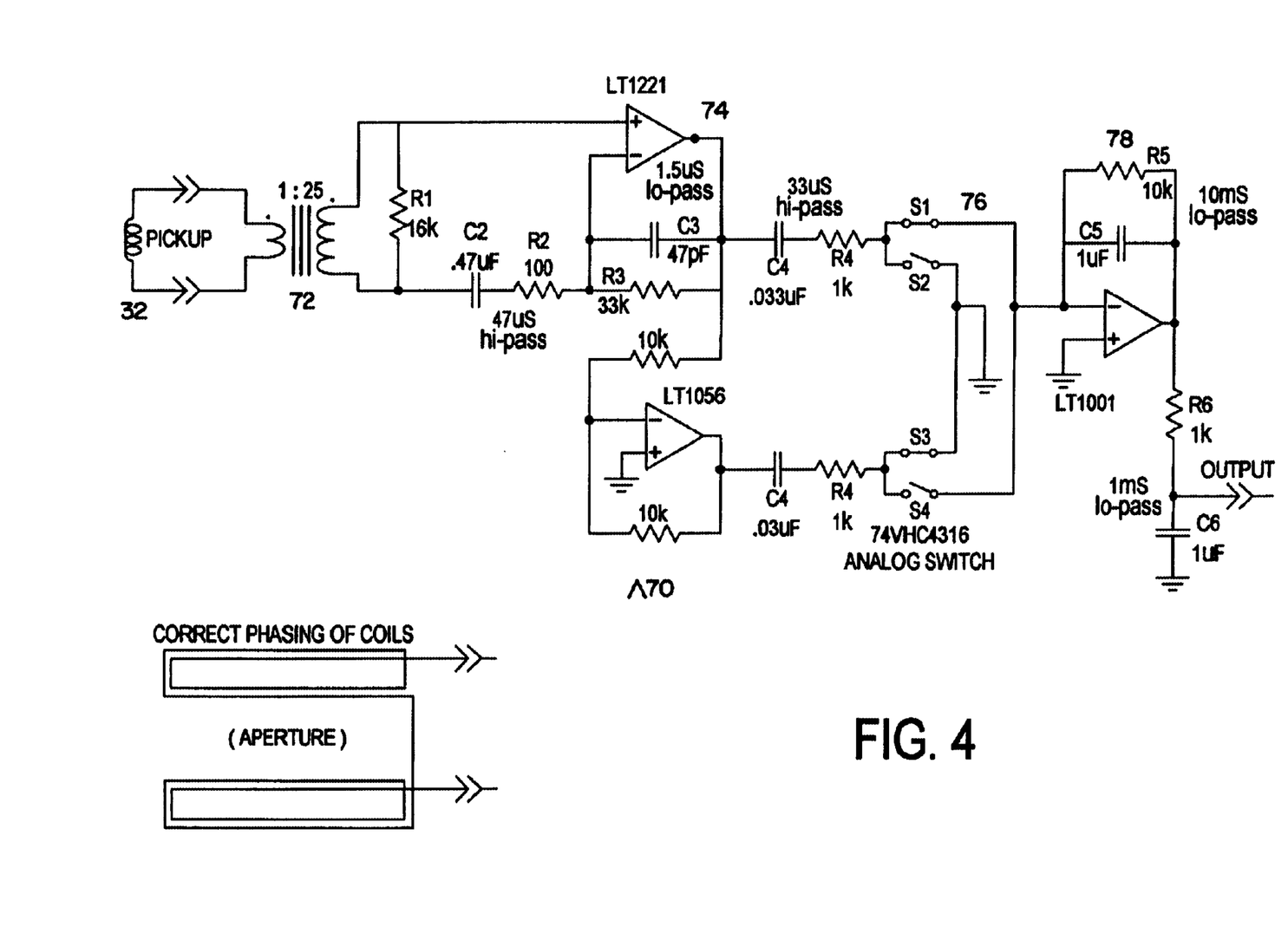
FIG. 4 shows an exemplary demodulator circuit used in the embodiment of FIG. 1B.

In this embodiment, the wave generator 50 output AC signal 59 is also provided to the detector circuit which detects the voltage induced in the pickup coils 32 by the magnetic field, as described in more detail with respect to FIG. 4. Thus, the wave generator 50 produces two outputs, an excitation signal 58 and a reference signal 59 of the same frequency.

In a preferred embodiment of the invention, the cable 24 includes signal wire 25 that is electrically connected from the wave generator 50 to the cable 24 to carry the excitation signal 58 driving the AC signal 29 (FIG. 1B) in the cable 24. Referring to FIG. 1B, the signal wire 25 completes a circuit between the wave generator 50 and the cable 24 to provide the AC signal 29 in the cable 24.

Preferably, the reference signal 59 is used by the demodulation circuit 70 to perform synchronous detection of the signals generated by the pickup coils 32 according to the excitation signal 58 energizing the cable 24. To provide electrical isolation of the wave generator 50 from the circuitry it is supplying a reference signal, the output signal of the wave generator 50 circuit is provided through the 6N136 optoisolators 55. Of course, other methods of isolation can also be used.

In another embodiment, the signal wire 25 need not be physically connected to the AC signal source, which allows grounding of the cable balancer or hoist 22 and payload 26 as well. Thus both ends of the cable 24 may be electrically grounded. To create an AC signal 29 in the cable 24, the output of the wave generator 50 is directed to a torodial transformer 60 (not shown) rather than being directly connected to the signal wire 25. The torodial transformer 60 is thus driven by the AC signal 58 produced by the wave generator 50. A torodial transformer 60 has a circular shape to form a central opening 62 where the magnetic field of the AC signal 58 from the wave generator 50 is most effective. Cable 24 is positioned to pass through the center 62 of the torodial transformer 60 where the AC signal 58 in the torodial transformer 60 induces a corresponding AC signal 29 in cable 24. In this way, the cable 24 can be electrically grounded at both ends, yet carry an AC signal 29 without direct electrical connection to the wave generator 50 or other circuitry. Of course, other methods of providing or inducing the alternating current can be utilized.

FIG. 4 shows a detector or demodulator circuit 70 capable of synchronously detecting the induced voltage of the pickup coils 32 (FIG. 2) by the magnetic field of the cable 24 to determine the deflection angle 28 of the cable 24. The detector circuit 70 receives the voltages induced in the pickup coils 32 at outputs 33A, 33B (FIG. 2) and includes the electronic circuitry to detect the minute voltages induced in the pickup coils 32. The detector circuitry 70 provides an overall voltage gain of about 82,500. First, the 1:25 transformer 72 detects and amplifies the AC signal in the pickup coils 32 by a factor of 25. The LT 1220 operational amplifier section 74 further amplifies the detected signal by a factor of 330. A 74VHC4316 analog switch or chopper 76 then inverts the amplified signal in phase with the 40 KHz square wave to produce a DC output signal that corresponds to the alternating current input signals at the 40 KHz frequency. The final amplifier 78 further amplifies the direct current by a factor of 10.

Because the detector circuitry 70 is extremely sensitive to 40 KHz signals in order to detect the small signals induced in the pickup coils, the detector circuitry 70 should be isolated and shielded to avoid interference from other signal sources. Signal sources in the 40 KHz range such as that generated by the wave generator 50 should especially be avoided. Preferably, the detector circuitry 70 runs on an isolated power supply derived from the raw 5 volts power supply, shown in FIG. 3, that powers the wave generator 50. Further, the 40 KHz reference signal 59 for synchronous detection is transmitted via optical isolators 55 (FIG. 3).

As noted, the detector circuitry 70 of this embodiment outputs a DC level signal corresponding to the voltage induced in the pickup coils 32. It should be understood that the detector circuitry 70 output may take many other forms such as a pulse train waveform with the length of pulses proportional or inversely proportional to the induced voltage in the pickup coils 32. Alternatively, the output signal may include a frequency signal with the frequency proportional to the induced voltage of the pickup coils 32.

Figures 5, 6:
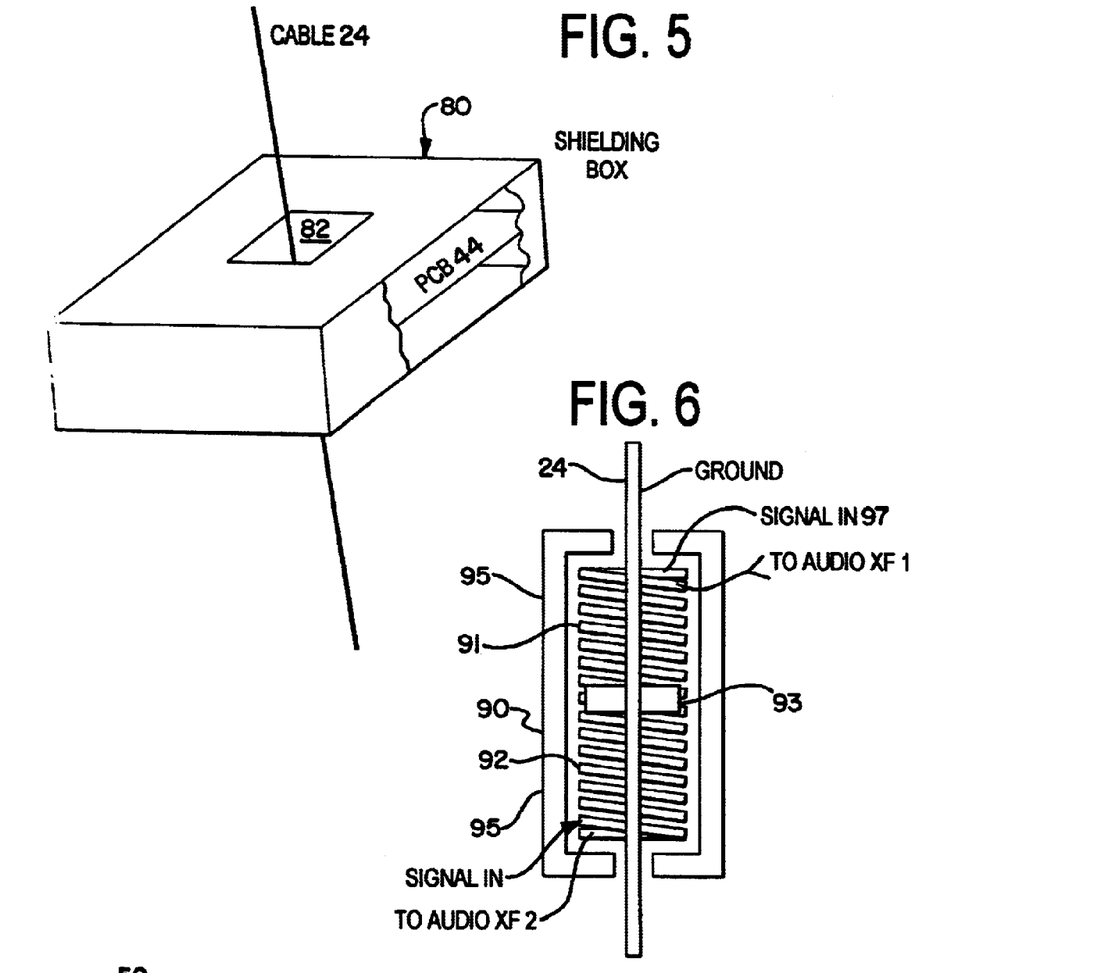
FIG. 5 shows an illustrative embodiment of a shielding box that can be used in the embodiment of FIG. 1B.
FIG. 6 shows a cross-section diagram of a z-axis detector that can be used with the embodiment of FIG. 1B.

Referring now to FIG. 5, shown is a shielding box 80 that can be used with the present embodiment to house the pickup coils 32 (not shown) on printed circuit board (PCB) 44. The pickup coils 32 are extremely sensitive to any magnetic fields passing through the wire spirals or wire windings of the pickup coil 32. Preferably, only the magnetic field associated with the AC signal 29 in the cable 24 is to be detected by the pickup coils 24. The wave generator 50, signal wire 25, as well as other sources may generate stray magnetic fields that may effect cable angle 28 measurements. To exclude magnetic fields except those associated with the cable 24 of interest, the pickup coils 32 are enclosed in a shielding box 80 that is made of a non-ferromagnetic but conductive material. In a particular embodiment, aluminum is used as shielding material but other materials can also be used as well. The shielding box 80 must be several skin penetration depths thick at the frequency of the AC signal. To allow the cable 24 to pass through the shielding box 80 to the cable angle detector 30, the box 80 has an opening 82 in its central section of sufficient width to allow the cable 24 to pass through and deflect according to its possible range of movement. Preferably, the height of the box 80 is similar to the diameter of the opening 82 to allow the desired magnetic fields from the cable to develop and penetrate the spirals of the pickup coils 32.

FIG. 6 shows an embodiment of a one-axis sensor that can be used with present embodiments to measure the force applied by an operator to indicate to the hoist 22 (FIG. 1B) whether to raise or lower the payload. FIG. 1B shows a small-scale version of an embodiment of a one-axis sensor with handle 90 that is shown in more detail in FIG. 6. In this embodiment, a user manipulatible handle 90 is disposed around the cable 24 supporting the payload 26. The handle 90 is positioned coaxial with the cable 24 and can be grasped by the operator to exert force indicating whether to lift or lower the payload as desired. Because the handle 90 is to be continually grasped and may be damaged or abused during use, it should be of a rugged construction to withstand the constant handling. Preferably, the handle 90 is constructed of metal, which is durable and can provide electrical isolation from any stray external magnetic field that may affect measurements. Preferably, the handle is constructed of aluminum forming an enclosure of an appropriate thickness to exclude magnetic fields.

Disposed within the handle 90 are a pair of springs 91, 92 arranged end-to-end, coaxial with and longitudinally along the length of the cable 24. A cylinder 93 is fixed to the cable 24 and is disposed within the handle 90 such that the cylinder 93 is positioned in between the pair of springs 91, 92. The outer ends of the springs 91, 92 are affixed to the ends of the handle 90 by an insulating material 95 that connects the ends of the springs 91, 92 to the inside the handle 90. The insulating material 95 should maintain the ends of the springs 91, 92 to the ends of handle 90. The ends of the springs 91, 92 also include electrical connections to permit the spring to be energized with an electrical signal.

As a force is applied to the handle 90 in a vertical direction, the handle 90 moves accordingly while the disk 93 remains fixed relative to the cable 24. Thus, one of the springs is stretched in length while the other spring has its length correspondingly compressed by the disk. It should be understood that the pair of springs 91, 92 may also be physically comprised of a single spring with two half spring portions 91, 92 separated by the disk 93.

In the illustrative embodiment, the two half springs 91, 92 can be energized with an electrical signal to cause the halves of the springs to act as electrical inductors. Generally, a compressed spring has a greater inductance than the same spring having the same number of physical turns that is stretched to a longer length. As the spring is compressed, the coils of the spring are brought closer together and the inductance of the spring increases. The difference in inductance between the two springs 91, 92 or two halves of the springs can therefore be measured to indicate the change in the displacement of the handle 90 and thus the force applied to the handle 90.

In this embodiment, a wave signal generator 50 such as that of FIG. 3 passes an AC signal 97 through the top and bottom of the half springs 91, 92. The AC signal 97 from the wave generator flows into both half springs at the end of the springs fastened to the ends of the handle 90 with the insulating material 95 to the central ends of the half springs, which are grounded by the disk 93. If no force is being applied to the handle 90, the length of the half springs 91, 92 are equal. Accordingly the inductances are equal and the voltages across the half springs 91, 92 are equal.

If a force is applied to the handle 90, however, the springs 91, 92 will be of different lengths and accordingly be of different inductances. The synchronous detector 70 will detect the imbalance across the half springs 91, 92 and determine the magnitude and direction of an applied force. The magnitude and direction of the force can be used to indicate whether to lift or lower the payload as well as to indicate the rate the payload is to be lowered.

While FIG. 6 shows an illustrative embodiment of the half spring sensor configured as a handle device for manipulating a payload, the present invention is not limited to use with such graspable devices. Generally, the spring handle sensor may be used in any instance where it is desired to measure the displacement of a spring.

Figure 7:
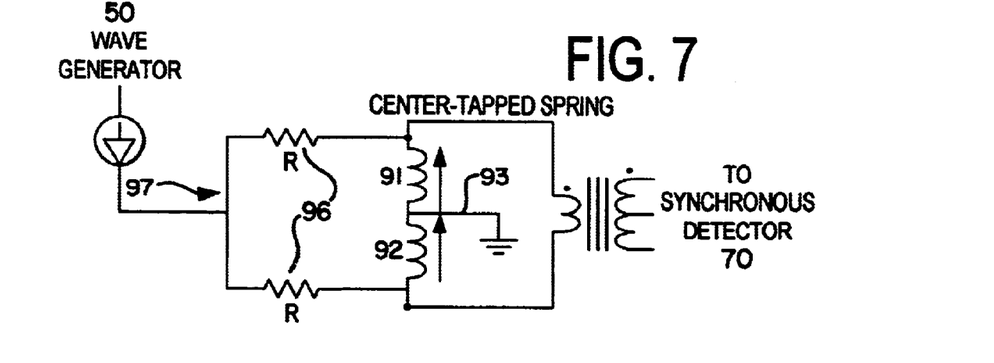
FIG. 7 shows a diagram modeling the embodiment of the z-axis sensor of FIG. 6.

FIG. 7 shows an equivalent electrical circuit diagram of the two half springs forming the Z-axis sensor. The half springs 91, 92 are shown as a pair of inductors with a center tap ground 93 corresponding to the disk 93. A wave generator 50 similar to that of FIG. 3 provides an AC signal 97 for energizing the inductors 91, 92. The wave generator 50 passes an AC signal 97 to the inductors 91, 92 through feed resistors 96. The center tap ground 93 configuration of the inductors 91, 92 such as provided through connection of the center of the springs 91, 92 to a grounded cable 24 cause the AC signal 97 to flow to the ground 93. A synchronous detector 70 is positioned to measure voltages across the inductors 91, 92. As the inductances 91, 92 change as a result of the lengthening or compression of the springs, the synchronous detector 70 will detect the difference in the voltages across the inductors 91, 92. The synchronous detector 70 can be similar to the embodiment shown in FIG. 4.

In other embodiments, the half springs 91, 92 may be comprised of variable rate springs that may allow different compression rates so that a user may more finely control the movement of the device. In addition, the springs may be made up of a plurality of other types of springs of differing spring constants and rates to provide variable rates and resistances.

The illustrative embodiments provide a durable and rugged sensor mechanism for measuring the force applied along a single axis. The intuitive actuation of applying an upward force directly to the cable to raise the payload and a downward force to lower the payload results in more ergonomic operation. Additionally, the illustrative embodiments provide a mechanism with fewer components that may be damaged or fail. By using the spring itself to measure the applied force, the device requires no delicate mechanisms that may be damaged in a punishing environment.

Another embodiment according to another aspect of the invention provides a parallelism sensor that provides the ability to measure the degree of parallel orientation of an object with respect to a reference plane or surface. This parallelism sensor embodiment is capable of providing information that can be used in a variety of different ways such as for feedback information to assist in motion control applications. In the illustrative embodiment described herein, the parallel orientation information is supplied as feedback to a motion control system such as one that controls the movement of an overhead rail system.

FIG. 1B shows an illustrative exemplary embodiment of an application of the parallelism sensor with an overhead gantry crane 100. The gantry crane 100 utilizes an overhead rail system with a bridge rail 23 carrying a balancer or hoist 22 oriented perpendicular to and spanning between two long rails 104, 106. The bridge rail 23 is powered by a motor system (not shown) with a motor at each end of the bridge rail 23 that allows it to be propelled back and forth along the long rails 104, 106. In this application, it is desirable to maintain the bridge rail 23 in perpendicular alignment to the long rails 104, 106 as the bridge rail 23 travels back and forth along the long rails 104, 106. A skew between the motor drive system driving opposite ends of the bridge rail 23 may cause the bridge rail 23 to be skewed in alignment with respect to the long rails 104, 106 rather than maintaining the desired perpendicularity.

FIG. 1A diagrams a top view of an illustrative application of the parallelism sensor showing the configuration of the parallelism sensor with an overhead gantry system. In this application, the sensor is embodied as a sensor pad or plate sensor 110 whose orientation to a conductive surface can be determined. In the illustrative embodiment of FIG. 1A, the sensor pad 110 is connected to the bridge rail 23 such that a flat side 111 of the sensor pad 110 is parallel with the length of the long rails 104, 106. Preferably, the long rails 104, 106 have a flat outside surface 105 facing the sensor pad 110. The present embodiment senses the orientation of the flat side 111 of the sensor pad 110 with respect to the flat surface 105 of the long rail 104. The orientation of the sensor pad 110 with respect to the long rail 104 is used as feedback information to move and maintain the bridge rail 23 to which the sensor pad 110 is attached in a perpendicular alignment with the long rail 104. The feedback information can be used to servo control the motors at each end of the bridge rail 102 to maintain the bridge rail 23 perpendicular to the long rail 104. Depending on the relative orientation of the bridge rail 23 to the long rail 104 provided by the sensor pad 110, the motors can be actuated to maintain the perpendicular alignment of the bridge rail 23 as it is propelled along the long rails 104, 106.

Figure 8A:
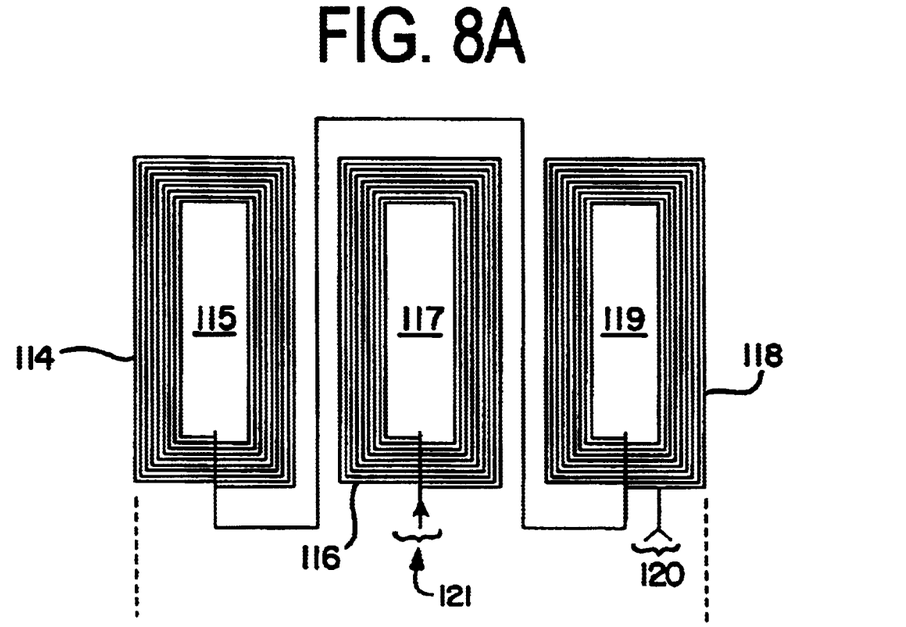

In this illustrative embodiment, the sensor pad preferably includes three flat or planar conductive coils 114, 116, 118 arranged as shown in FIG. 8A. The pickup coils 114, 116, and 118 are arranged in a line along one direction of the sensor pad. The pickup coils 114, 116 and 118 are shown as forming rectangular loops, each loop with a central opening 115, 117, 119. In the described embodiment the pickup and energized coils are illustrated as geometrically shaped loops. In practice, however, the pickup and energized coils may also be of other shapes as can be advantageous designed according to the desired application. The planar coils 114, 116, 118 are positioned parallel to the flat face 111 of the sensor pad 110 (FIG. 1A). Preferably, the pickup coils 110 are printed as traces in a printed circuit board. Of course, as in other described embodiments the coils may also be composed of wire wound coils.

In this embodiment, the second or middle coil 116 is an energized coil carrying an AC signal such as that generated by the wave generator 50 previously described herein with reference to FIG. 3. The wave generator 50 can be connected to at input 119 to provide the AC signal to the energized coil 119. The AC signal carried by the energized coil 116 creates a fluctuating magnetic field passing through the opening 117 of the energized coil 116 and surrounding the energized coil 116 as described in more detail below. The first and third coils 114, 118 are pickup coils configured to sense the fluctuating magnetic field generated by the energized coil 116. The first and third pickup coils 114, 118 surround the energized coil 116 such that the pickup coils 114, 118 are equally spaced from the energized coil 116 and the three coils 114, 116, 118 are preferably aligned along a single a line. Preferably, the pickup coils 114, 118 are connected in a series electrical connection formed of a single conductive trace or wire to provide a single conductive electrical path with a single output connection 120 as shown more clearly and described later in FIG. 10. Preferably, the first and third coils 1 14, 118 are passive sensor or pickup coils that have an equal number of turns but are oppositely wound in different directions (clockwise and counter-clockwise). When the magnetic flux lines passing through the openings 115, 119 of the two pickup coils 114, 118 are equivalent, the induced voltages in the two coils cancel one another and no voltage will appear at the output 120. The output 120 of the pickup coils 114, 118 is provided to detector circuitry similar to the synchronous detector circuit 70 of FIG. 4. Preferably, the detector circuit similar to the synchronous detector 70 of FIG. 4 detects the non-canceled induced voltage of pickup coils 114, 118 due to the difference in magnetic flux passing through the two pickup coils 114, 118.

Figure 9:
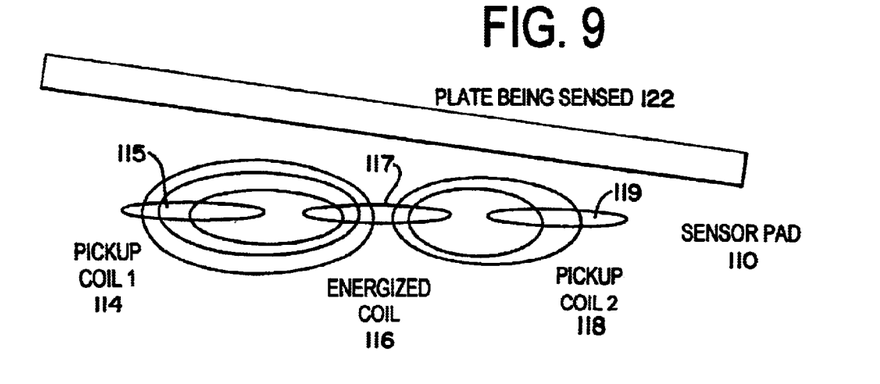
FIG. 9 shows a diagram illustrating the operation of the parallelism sensor.

FIG. 9 shows a top view illustration of a sensor pad 110 oriented with respect to a reference surface 122 or plate. The energized coil 116 creates a magnetic field emerging through opening 117 in the center of and surrounding the energized coil 116. The pickup coils 114, 118 are positioned adjacent the energized coil 116 such that the magnetic field emerging from the energized coil passes through the central openings 115, 119 of the pickup coils 114, 118. Ordinarily, the magnetic fields passing through pickup coils 114, 118 flanking the energized coil 116 are equal and cancel any induced voltages generated in the pickup coils 114, 118.

When the sensor pad 110 supporting the coils 114, 116, 118 is in the vicinity of a conductive (but non-ferromagnetic) surface 122, the conductive surface 122 will prevent the lines of magnetic flux from penetrating into the surface 122. Typically, a magnetic flux cannot penetrate a non-ferromagnetic material such as aluminum. At a conductive surface, the lines of magnetic flux must run tangent along the surface. For aluminum, constant DC flux lines may freely penetrate the surface—aluminum is essentially invisible to a DC magnetic field. In contrast, AC magnetic fields only penetrate aluminum to a characteristic depth called the skin depth. The degree of penetration falls off with the distance into the surface of the material and varies according to the AC frequency of the magnetic field.

In this embodiment, the conductive surface 122 is made of aluminum. If the conductive surface 122 is parallel to the sensor plate 110 and thus equally distant from the pickup coils 114, 118, the fluctuating magnetic field is equally affected by the surface 122 and the flux through the pickup coils 114, 118 remain equal. Accordingly, any voltages induced in the pickup coils 114, 118 will be canceled. When the surface 122 is no longer parallel to the pickup coils 114, 118, as shown in FIG. 9, for example, the surface 122 no longer equally affects the AC magnetic field. Due to the variation of the surface 122 across the pickup coils 114, 118, the AC magnetic field directed between the two pickup coils 114, 118 will be unequal. As shown in the embodiment of FIG. 9, for example, the orientation of the surface 122 places the surface 122 closer to pickup coil 118 allowing more magnetic flux to pass through pickup coil 114 than pickup coil 118.

Accordingly, the output of the pickup coils 120 of FIG. 8A will no longer cancel and be zero. The output of the pickup coils 120 will be a signed (+/−) output voltage signal that corresponds to the angle of deviation of the sensor pad 110 and the surface 122.

Figure 10:
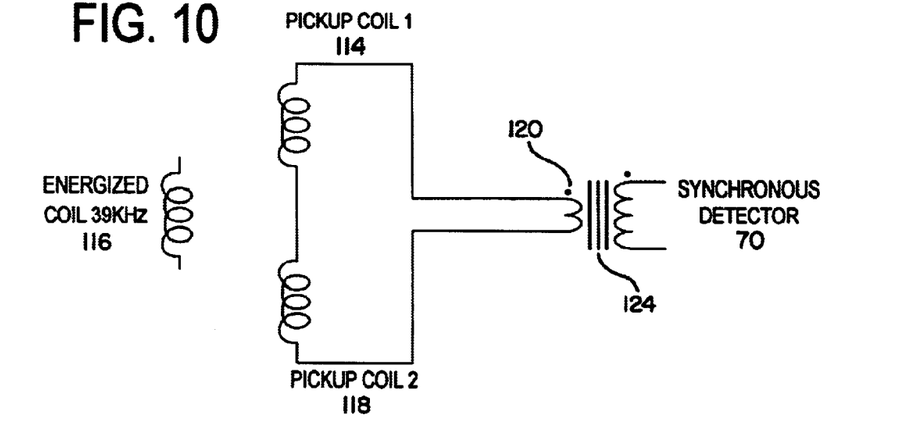
FIG. 10 shows an equivalent circuit diagram of the parallelism sensor.

Similarly in the illustrative overhead gantry embodiment, when the sensor pad 110 on the bridge rail 23 (FIG. 1A) develops a skew with respect to the long rails 104, the surface 105 of the long rail 104 no longer equally confines the magnetic field. When the surface of the sensor plate 110 fixed to the bridge rail 23 is not parallel to the long rail 104, more magnetic field lines are encouraged to pass through one of the pickup coils of the sensor plate 110 than the other pickup coil according to the skew of the bridge rail 23 relative to the long rail 104. Due to the variance of the magnetic flux through the pickup coils 114, 118 the induced voltages in the pickup coils will no longer cancel and a voltage difference between the two pickup coils 114, 118 can be detected by the detector circuitry 70. FIG. 10 shows an equivalent circuit diagram modeling the interaction of the fluctuating magnetic field of the energized coil 116 with the pickup coils 114, 118. As shown in FIG. 10, the energized coil 116 carries an AC signal of an approximately 40 KHz frequency to create a fluctuating magnetic field that can be detected as an induced voltage in the pickup coils 114, 118. The pickup coils 114, 118 are in a series electrical connection that voltages in the respective pickup coils subtract from each other and provide an AC signal at output connection 120. When the magnetic field of the energized coil 116 penetrates the pickup coils 114, 118 in equal amounts, such as when the pickup coils are parallel to a conductive surface, the induced voltages in the pickup coils 114, 118 are equal and opposite. The polarity of the pickup coils accordingly subtract and cancel from one another. When the pickup coils 114, 118 are not parallel to the conductive surface, the induced voltages in the pickup coils will differ and result in a signed output voltage at output connection 120 indicating the angle deviation of the surface from parallel. The AC signal at output connection 120 can be detected by a synchronous detector circuit such as previously described herein.

Figure 8B:
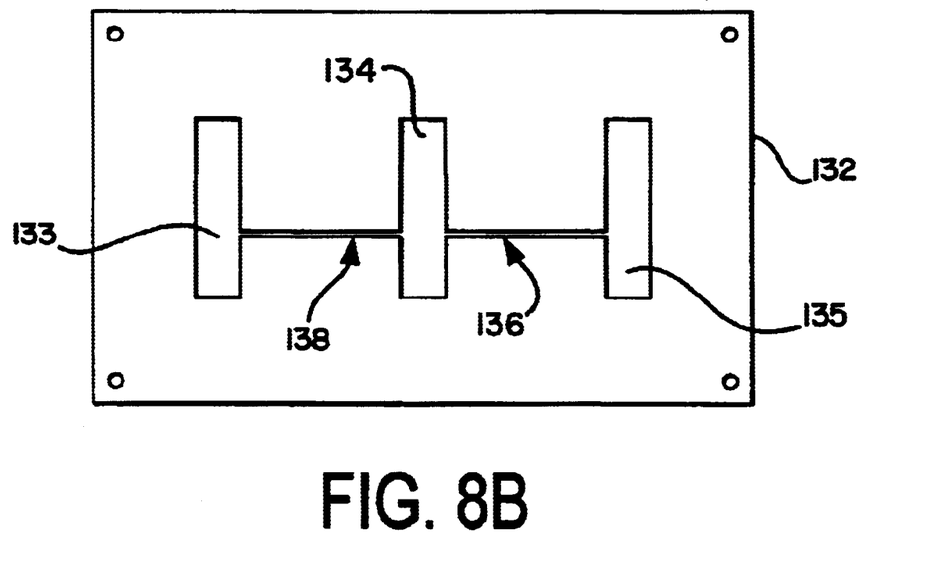
FIG. 8B shows a flux mask for a sensor pad according to another aspect of the invention.
Figure 11:
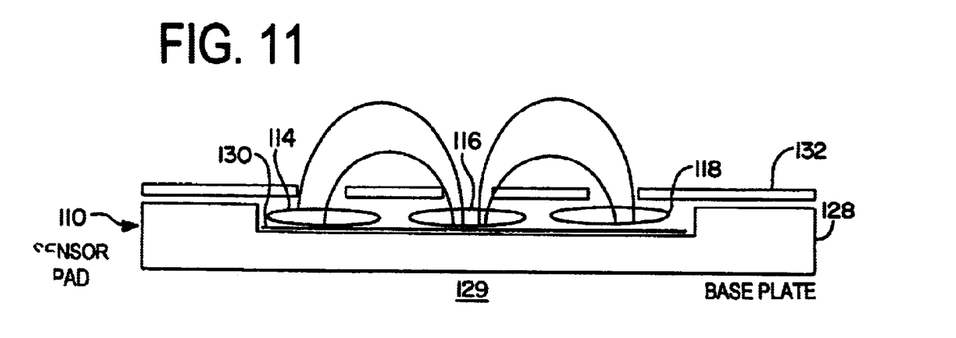
FIG. 11 shows a cross-sectional diagram of the plate sensor.

FIGS. 11 and 8B show additional aspects of a preferred embodiment of the parallelism sensor. While shown as part of the illustrative embodiment, it should be understood that the described features are strictly optional and any of these features may be omitted. FIG. 11 shows a cross-sectional view of the sensor pad 110 with the pickup and energized coils 114, 116, 118 disposed within the sensor pad 110. The sensor pad 110 includes a base plate 128 that the pickup and energized coils 114, 116. 118 are disposed within. The base plate 128 serves to confine magnetic flux lines from the energized coil 116 that might otherwise emanate through the back of the sensor pad 110. Stray magnetic fields extending out the back of the sensor pad 110 can be affected by other objects which are at the rear 129 of the sensor pad 110. These objects may interfere with the magnetic field emanating through to the rear 129 of the sensor pad 110 and result in erroneous measurements. To avoid interference from objects, the base plate 128 confines magnetic fields to the front of the sensor pad 110. Thus, the pickup coils 114, 118 measure only the magnetic fields of interest, which are confined to the front of the sensor pad 110. Preferably, the base plate 128 is composed of a non-ferromagnetic material, such as aluminum, of a sufficient thickness such that the magnetic field of the energized coil 116 is confined to the flat face 111 (not shown) on the front of the sensor pad 110 as shown in FIG. 11. The aluminum base plate 128 is preferably of a thickness greater than the skin depth according to the frequency of the AC magnetic field.

A flux-return plate 130 covers the area behind (shown as underneath) the pickup and energized coils 114, 116, 118. The flux return plate 130 provides a high permeability return path for the magnetic flux lines such that they need not extend out the rear of the sensor pad 110. Preferably the flux-return plate 130 is made of a ferromagnetic material of high permeability. In addition, a flux mask 132 with appropriate openings corresponding to the opening of the coils 114, 116, 118 is placed over the energized and pickup coils 114, 116, 118.

Referring now to FIG. 8B, the flux mask 132 is constructed of copper or aluminum and is positioned to overlay the pickup and energized coils 114, 116, 118 shown in FIG. 8A. The flux mask 132 is placed in front of all three coils 114, 116, 118 and has three openings or portals 133, 134, 135 corresponding to the openings 115, 117, 119 in the middle of the energized and pickup coils 114, 116, 118. The portals 133, 134, 135 shown in FIG. 8B allow the AC magnetic flux lines emanating from the energized coil 116 to return via only the portals 133, 135 corresponding to the pickup coils 114, 118. The portals 133, 135 necessarily cause the magnetic flux lines to pass only through the pickup coils 114, 118 in order to provide a more efficient device. Without the flux mask 132, any magnetic flux lines emanating from the center of the energized coil 116 that return through the backside of the sensor pad 110 via the high permeability flux-return plate 130 without passing through either of the pickup coils 114, 118 are wasted.

Also shown in FIG. 8B are further details of the construction of the flux mask 132. Preferably, the flux mask is composed of a copper layout on a printed circuit board. Slits 136, 138 of non-copper connect the portals 133, 134, 135 to avoid forming conductive loops around the portals where a net AC flux is expected. A closed conductive loop is susceptible to inducing a current in the conductive loop that will destructively oppose the flux passing through the loop according to Lenz's law. To avoid such a closed loop the slits 136, 138 break up any closed conductive paths around any of the three portals 133, 134, 135 and avoid any destructive interference from the conductive loop. Two or more flux mask laminations of the sort shown in FIG. 8B can be overlapped or superimposed with the slits not aligned so long as the laminations are not in intimate electrical contact.

While the flux mask 132 and the flux return plate 130 are used in an illustrative embodiment, the sensor pad 110 is not limited to this embodiment. The sensor pad 110 can be built or implemented without the flux mask 132 or the flux return plate 130.

The illustrative embodiments have many applications and provide many advantages. The deflection of a payload or support member can be measured without physical contact with the measured support or payload that may damage the device or impede the motion of the support member. The present embodiments can be used in a wide variety of applications. In this example, the measured deflection of the support is utilized to determine the forces applied to a payload attached to the support. Other embodiments of the invention can be utilized to provide a force sensor to detect the forces along a single axis. According to this embodiment of the invention, a more durable and rugged handle to raise or lower a payload is provided. This handle of increased ruggedness has fewer parts and mechanisms that can be damaged by the handling and wear and tear that such a handle device is likely to suffer. Other embodiments of the invention provide the ability to sense the orientation of a surface or object without mechanical contact with the surface. The orientation of a surface or device with respect to a reference surface can be used to determine the parallel alignment of a device such as an overhead gantry crane.

In view of the wide variety of embodiments to which the principles of the present invention can be applied, it should be understood that the illustrated embodiments are exemplary only, and should not be taken as limiting the scope of the present invention. For example, the role of the pickup coils and energized coils could be exchanged. The outer flanking coils could be energized and the middle coil could serve as the pickup coil. In other embodiments the pickup coils can be configured in other arrangements. For example, additional pickup coils can be added above and below the energized coil to provide sensing of the sensor pad in the vertical axis and thus provide a two-axis detector. For example, the springs can serve only as the emitter of magnetic field with the detection accomplished by a coil at the center.

In addition, an embodiment of the invention can be implemented using ferromagnetic materials, which have high permeability to magnetic fields, by those skilled in the art using the principles taught herein. In ferromagnetic materials, the lines of magnetic flux run perpendicular to the surface of the material and the magnetic flux may travel freely through the material. An embodiment taking into account these dissimilar properties of non-ferromagnetic and ferromagnetic fields can be devised according to the teachings of the present embodiments.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

I claim:

1. An apparatus for measuring a deflection of a support member from an initial position, comprising:
    a support member carrying an electric current;
    a magnetic field associated with the electric current; and
    a plurality of coils positioned adjacent to the support member, wherein a deflection in the support member and the magnetic field induces a current in the plurality of coils corresponding to the deflection of the support member.

2. The apparatus of claim 1 wherein the measured deflection comprises an angle formed between the support member and the initial position of the support member.

3. The apparatus of claim 2 wherein the measured deflection of the support member is supplied as feedback to a motor control system.

4. The apparatus of claim 1 wherein the support member comprises a cable supporting a payload.

5. The apparatus of claim 4, further comprising a cable hoist/balancer wherein the cable is pivotally mounted to the cable hoist/balancer.

6. The apparatus of claim 1, wherein the support member comprises a chain supporting a payload.

7. The apparatus of claim 6, wherein the support member further comprises a pipe surrounding a portion of the chain.

8. The apparatus of claim 1, wherein the support member is rigid and supports a payload from below.

9. The apparatus of claim 4, wherein the measured deflection of the cable is utilized to determine the forces applied to the payload.

10. The apparatus of claim 1 further comprising an aperture, wherein the support member passes through the aperture.

11. The apparatus of claim 10 wherein the plurality of coils and the aperture are positioned to lie in the same horizontal plane.

12. The apparatus of claim 10 wherein the plurality of coils are symmetrically arranged surrounding the aperture.

13. The apparatus of claim 10 wherein the plurality of coils are fabricated on a printed circuit board having said aperture.

14. The apparatus of claim 1 wherein the magnetic field associated with the support member is according to an AC signal carried by the support member.

15. The apparatus of claim 14, further comprising a wave generator circuit generating the AC signal carried by the support member.

16. The apparatus of claim 1 further comprising a demodulator circuit coupled with the plurality of coils to detect the current induced in the coils corresponding to the deflection of the support member from the initial position.

17. The apparatus of claim 16 wherein the demodulator circuit detects the current induced in the plurality of coils synchronously with an AC signal passing through the support member.

18. The apparatus of claim 16 wherein the demodulator circuit produces a DC output proportional to the deflection of the cable in one plane.

19. The apparatus of claim 1 further comprising toroidal transformer positioned to pass the support member through the transformer to induce an alternating current in the support member to create the magnetic field associated with the support member without mechanically coupling an alternating current source to the support member.

20. An apparatus for measuring the deflection of a cable from an initial position, comprising:
- an energized cable carrying an AC signal and producing a magnetic field;
- an aperture in which the energized cable passes through the aperture; and
- a plurality of coils positioned adjacent to and surrounding the aperture;
- wherein the deflection of the magnetic field of the energized cable passing through the aperture induces a voltage in the plurality of coils according to the deflection of the energized cable.

21. The apparatus of claim 20 further comprising:
- a demodulator circuit coupled to the plurality of coils, wherein the demodulator circuit measures the induced voltage in the coils.

22. The apparatus of claim 21 further comprising a shielding box to house the demodulator circuit.

23. The apparatus of claim 21 further comprising a shielding box to house the plurality of coils.

* * * * *

UNITED STATES PATENT AND TRADEMARK OFFICE
CERTIFICATE OF CORRECTION

PATENT NO. : 6,668,668 B1  Page 1 of 1
DATED : December 30, 2003
INVENTOR(S) : Michael A. Peshkin

It is certified that error appears in the above-identified patent and that said Letters Patent is hereby corrected as shown below:

<u>Title page,</u>
Item [73], should read:
-- Assignee: Northwestern University
Evanston, IL --

<u>Column 1,</u>
Line 5, insert -- GOVERNMENT LICENSE RIGHTS
The U.S. government has a paid up license in this invention and the right in limited circumstances to require the patent owner to license others on reasonable terms as provided for by the terms of grant number DMI-9634813 awarded by the National Science Foundation --.

Signed and Sealed this

Sixth Day of April, 2004

JON W. DUDAS
*Acting Director of the United States Patent and Trademark Office*